Feb. 13, 1962   G. MARTENS   3,021,066
ELECTRONIC CALCULATOR
Filed Dec. 16, 1957   6 Sheets-Sheet 1

INVENTOR
Gunter Martens
BY Michael S. Striker
ATTORNEY

Feb. 13, 1962

G. MARTENS 3,021,066

ELECTRONIC CALCULATOR

Filed Dec. 16, 1957

INVENTOR
Güster Martens
BY Michael J. Striker
ATTORNEY

United States Patent Office 3,021,066
Patented Feb. 13, 1962

3,021,066
ELECTRONIC CALCULATOR
Günter Martens, Schliersee, Upper Bavaria, Germany, assignor to Kienzle Apparate G.m.b.H., Villingen im Schwarzwald, Germany
Filed Dec. 16, 1957, Ser. No. 703,166
Claims priority, application Germany Dec. 17, 1956
22 Claims. (Cl. 235—160)

The present invention relates to an electronic calculator and more specifically to an arrangement within such an electronic calculator for carrying out the shifting of decimal orders which is necessary in the performance of calculations.

Certain means for shifting the decimal orders in a calculator are known but they are not satisfactory and even likely to get out of order easily so that frequently wrong results are obtained on account of this characteristic. A rather simple device for carrying out the shifting of decimal orders is an arrangement of multiple contact switches of the type which is widely used in telephone exchanges as automatic connector switches operated by the impulses produced by dialing. However, in an electronic calculator where two mechanisms, each adapted to handle 16 digit figures are arranged for cooperation with each other, such a selector or connector switch would have to have 16 banks of contacts, each bank having 16 contacts. Therefore the switch would have to comprise more than 250 individual contacts and it is quite clear that the difficulties known to be characteristic for the use of electrical contacts in general, would necessarily lead in such a case of a very high number of contacts to a substantial unreliability of the apparatus because trouble with any one of these many contacts is likely to develop at any time. Besides, there is also the drawback that for the operation of such a selector or connector switch a very substantial electrical power is required which is also a factor that may cause trouble.

Other known devices designed for mutually associating the decimal orders and working with electron tubes require a very involved electrical and mechanical set-up so that this type of device cannot be used or considered except in connection with very large calculating equipment. For example, in calculating equipment of this type it has been proposed to carry out the shifting of decimal orders by means of magnetic storage drums together with a plurality of magnets, but also this solution of the problem is not suitable for smaller calculators intended to be used in business because the mechanism is far too involved and costly. The present invention is intended to be used mainly in smaller commercial type calculators.

The shifting of decimal orders is an operation which mainly becomes necessary in electronic calculators when multiplications or divisions are to be carried out, and this shifting operation takes place between the calculating mechanism and the totalizer mechanism, or between the totalizer mechanism and a storage device, or between one of these above mentioned mechanisms and a printing mechanism. Means for properly associating mutually the decimal orders as mentioned above, are of particular importance in electronic calculators which are used in conjunction with mechanical devices as for instance in the case of bookkeeping machines, billing machines, etc.

In calculators of this type it is desirable in a multiplication operation to inject the second factor digit by digit by means of a keyboard and to have the calculator mechanism arranged in such a manner that immediately after the injection of each one of said digits within the various decimal orders, the corresponding partial multiplication and subsequently the adding-up of each of said partial products to another one obtained previously is carried out with the correct relative association of decimal orders. However in this case great difficulties are encountered because the calculator cannot know in advance how many decimal orders the second factor will have. In addition, both factors of the multiplication may have decimal points located variously within the sequence of the decimal orders. Thus it is evident that the result appearing in the totalizer mechanism cannot be transmitted immediately to a printing mechanism comprising devices for also printing the decimal point, unless before doing this the said result has been processed in a suitable manner. It is therefore necessary that the calculator automatically determines the position of the decimal point in the result on the basis of the number of orders existing in the two multiplication factors to the left of the respective decimal points thereof. On account of this the decimal orders of the product or result must be shifted in the transmission to the printing mechanism in such a manner that the printed result has the decimal point in the correct place. This one example should show impressively how important it is for an electronic calculator to be equipped with a reliable means for mutually associating decimal orders in the handling of various factors, so that the calculator can be expected to work satisfactorily.

In view of the above it is a main object of this invention to provide in an electronic calculator suitable arrangements for mutually associating and, wherever necessary, shifting the decimal orders of the factors involved in the calculation, without however incurring the disadvantages and difficulties still present in known devices.

It is a further object of this invention to provide for the purposes set forth a comparatively simple combination of reliable elements.

Other objects will appear from the following description of some preferred embodiments of the invention.

With above objects in mind, the invention solves the above explained problems satisfactorily and reliably by providing between two cooperating mechanisms of the calculator a control arrangement which incidentally operates without electron tubes or mechanical contacts, and which makes it possible to transmit from one of said mechanisms to the other multi-order values in any desired or in a selected association of the corresponding orders. To accomplish this, the calculator is equipped with a first mechanism including a first set of pulse-emitter units associated, respectively, with a first series of decimal orders, a second mechanism including a second set of pulse-receiver units associated, respectively, with a second series of decimal orders, a set of first lines emanating from said first set of units, respectively, and assigned to the respective orders, a set of second lines emanating from said second set of units, respectively, and assigned to the respective orders, and control means for selectively interconnecting any one of said set of first lines with any one of said set of second lines for establishing operative connection between said first and second mechanisms in such a manner that pulses representing values containing a plurality of orders are transmitted from said first mechanism to said second mechanism in a selected association of the corresponding orders of said first and second series of orders.

More specifically, in a preferred embodiment of this invention, said set of first lines extends in one first direction and said set of second lines extends in a direction transverse to said first direction so as to determine a plurality of intersection points where one of said first lines crosses one of said second lines, wherein actuatable connecting elements are respectively located at a plurality of said intersection points, each connecting element being operatively connected to the first and second lines crossing each other at the particular intersection point, and additionally diagonal control lines extend from an intersection point between one first and one second line to the consecutive intersection points between the consecutive first lines and the consecutive second lines, respectively, each of said diagonal lines connecting a plurality of said connecting elements with each other and serving to actuate the connecting elements connected by the particular diagonal control line so that thereby the first and second lines crossing at any particular intersection point along the particular diagonal control line are respectively connected with each other. In a further development of the arrangement set forth one switch means movable between an inoperative and operative condition is connected in a circuit with each of said diagonal control lines, respectively, said switch means being provided with blocking means precluding the possibility that of said switch means more than one at a time is placed in operative conditions, in which it causes actuation of the connecting elements connected in the pertaining diagonal control line.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 4:
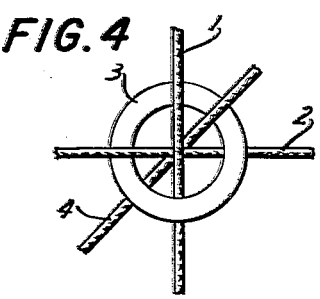
FIGURE 4 illustrates diagrammatically one of the magnetic connecting elements shown in FIGURES 1, 2 and 3.

Referring now to FIGURES 1, 4, 5 and 8, the arrangement includes a totalizer mechanism R and a printing mechanism D. The totalizer mechanism comprises eight individual units shown as squares, and numbered from right to left with the numerals "1"–"8" which numerals represent the orders of the multi-order values appearing in the mechanism R. Every one of these units is adapted to emit pulses according to the particular digits injected into the particular unit by the calculator, which impulses are to be transmitted to the individual units of the printing mechanism D. The individual units of this mechanism are also shown as squares, numbered with the numerals "1"–"6" representing the orders of the values dealt with by the mechanism D, and are adapted to receive the impulses from the mechanism R so as to carry out the final printing operation. The numerals inside the squares representing the units in both mechanisms represent the consecutive number of the various decimal orders constituting the values that are to be transmitted from one mechanism to the other. The numerals above the individual unit squares of the mechanism R represent one example of calculation that will be described further below. From each individual unit of the totalizer mechanism R emanates a line 1, all together forming a set of lines extending in one direction. Similarly, from each individual unit of the printing mechanism D a line 2 emanates so as to form a second set of lines extending in a direction transverse to the direction of the lines 1, whereby a number of intersection points between said first lines and the second lines are established. In this embodiment the lines 1 and 2 are not conductively connected with each other at the intersection points. They are, however, operatively connected because at a plurality of intersection points a connecting element 3 is arrange so as to transmit impulses arriving through the lines 1 to the lines 2. As is illustrated by FIGURE 4, the connecting element 3 in this embodiment is a magnet core of annular shape and of the type which has a rectangular hysteresis loop, the lines 1 and 2 being threaded through the inner opening of the annular core 3. In addition, the arrangement contains a plurality of diagonal control lines 4 which connect one intersection point between a line 1 and a line 2 with the intersection point of the consecutive lines 1 and lines 2, respectively, as clearly shown in FIGURE 1. The diagonal control lines 4 are also passed through the inner opening of the magnet core 3 as is likewise illustrated by FIGURE 4 so that impulses passing through any one of the lines 1, 2 or 4 will influence the magnetism in the core 3 and thereby, under certain conditions, generate or transmit impulses in and through one of the other lines. The function of annular magnetic cores combined with several single-turn coils or wires threaded through such core is well known to the art, e.g. from U.S. Patent 2,691,156.

Figure 7A:
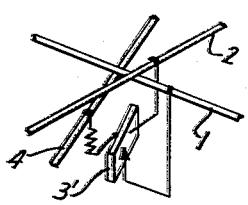
FIGURE 7a illustrates on a larger scale a detail of the transistor elements and their connections as incorporated in FIGURE 7.

Each one of the diagonal control lines 4 is connected in circuit with respective switches 1V, 2V, 3V, 4V, 5V, and 6V, all arranged as a switch assembly V′ designed to control the operation of the above mentioned means for transmitting impulses from one mechanism to the other. The diagonal control lines 4 are marked in FIGS. 1, 2, 3, 6 and 7 by the numeral 4 with the addition of another numeral referring to the numeral of the respectively connected switches 1V–6V, devices $S_1$–$S_6$, elements "1"–"15" of combinations $S_1$, $S_2$ (FIG. 3) or $C_1$–$V_3$ (FIG. 7). It will be noted that the switch assembly V comprises as many switches as there are lines 2 or pulse-receiving units in the mechanism D. In the example illustrated a totalizer mechanism capable of handling eight digit figures is cooperating with an electromechanical printing device capable of handling six digit figures.

As is known, for instance from U.S. Patent 2,757,862, the results can be read out from a totalizer designed for decimal figure systems in such a manner that ten checking impulses are injected simultaneously into each decimal unit of the result accumulator. The block C in FIGURE 1 symbolizes the means for injecting said checking impulses simultaneously into all of the units of the totalizer mechanism R. In each unit the injection of said ten impulses results in a "counting" operation starting from the particular digit value already existing in the particular unit until the same value is reached at the end of the series of ten impulses. If these impulses are positive, the "counting" proceeds in advancing direction and, when the digit 9 is reached a gate is closed whereby the further following impulses not only re-establish in the particular unit the setting for the said already existing digit, but are also transmitted to the corresponding impulse-receiving unit. Consequently, each unit, depending upon the digit value contained therein, emits a pulse into the pertaining line 1. Every time when the digit contained therein has been counted below "zero" or above "nine," usually, the primary pulses mentioned above are used not only for re-setting the counting elements but also to stop in the printing device the type-moving rods which advance synchronously with the above mentioned counting operation in the units of the totalizer mechanism. The arrangement and structure of said type moving rods has not been illustrated in the drawing because they are entirely known and conventional. By means of these rods corresponding printing segments are being moved into selective positions so that by means of these elements the result of calculation can be transmitted from the electronic totalizer mechanism to the printing mechanism. It is evident, that in this system of transmitting values at the output side of each unit of the totalizer mechanism R only one single pulse will appear in the corresponding line 1 when the value has been read out. Now, according to the invention a "half-matrix" is arranged between the electronic totalizer mechanism R and the printing device D and comprises the above mentioned magnet cores 3 and the lines 1, 2, 4 so that the values from the totalizer R are transmitted to the printing device D as follows: as mentioned above the magnet cores 3 are preferably of the type characterized by having a rectangular hysteresis-loop and are adapted to be converted by an electrical impulse from a saturated condition of one polarity into a saturated condition with the opposite polarity.

Figure 1:
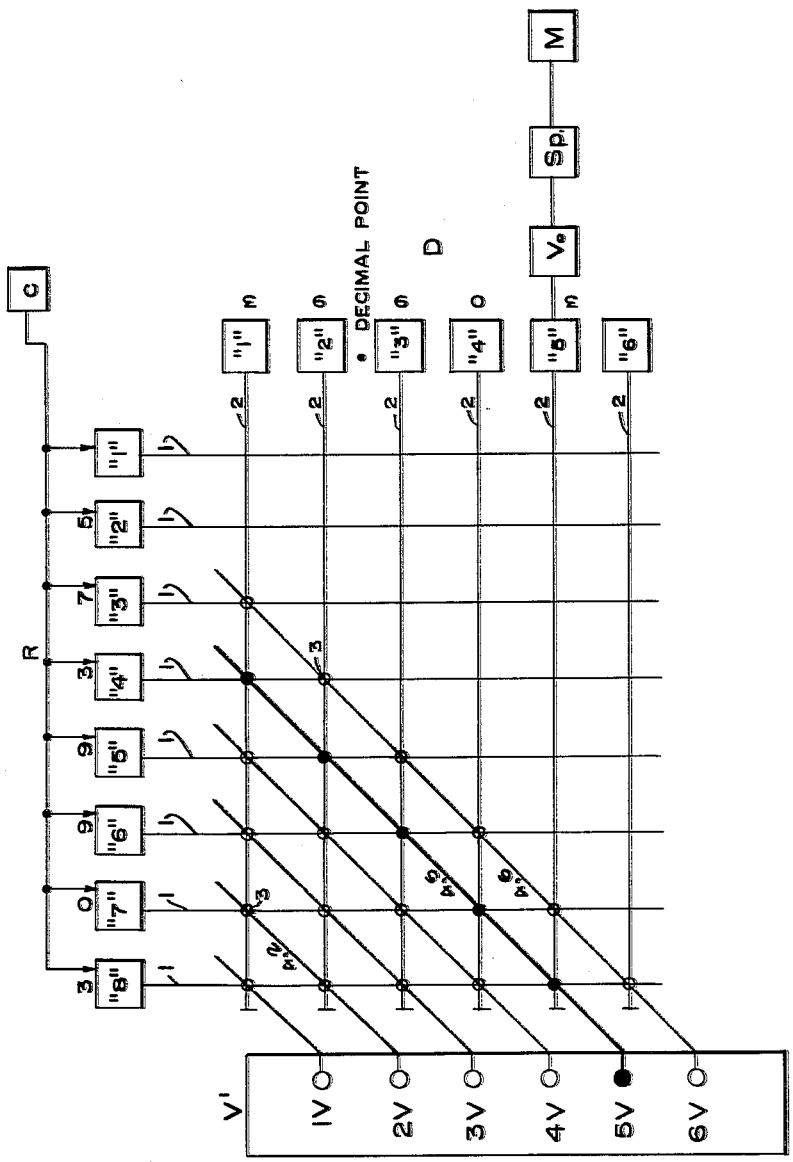
FIGURE 1 is a diagrammatic illustration of an arrangement according to the invention, designed for transmitting multi-order values in one direction only.

Let it be assumed that in the calculator a multiplication 82.65×3.75 has been carried out so that the result having seven digits 3099375 has appeared in the totalizer units marked with the numerals "8" down to "2" as indicated in FIGURE 1. Now the operator would have the task to determine in advance the position of the decimal point in this result.

Since for the convenience of the operator the multiplier is to be fed into the calculator starting with the digit of the highest decimal order, the result appears in the totalizer mechanism likewise starting with the digits in the highest decimal orders, and in a manner generally known a device controls the assignment of every unit to the various decimal orders in such a manner that each time when the next following decimal orders of the multipler are fed into the mechanism, the corresponding partial products of the multiplicand are assigned to the consecutively lower decimal orders of the totalizer mechanism. Advantageous forms of such a device will be described below.

Referring again to the above mentioned example of a calculation, two decimal orders to the left of the decimal point in the multiplicand plus one decimal order in the multiplier entail three decimal orders to the left of the decimal point in the result or product, which means that in the transmission of the result to the printinge device D the result must be subject to a shifting of the decimal orders in such a manner that the digit of the highest decimal order, i.e., the digit present in the eighth unit "8" of the totalizer R must be transmitted into that unit of the printing mechanism D which represents the third decimal order to the left of the decimal point. Since in this particular case it is assumed that the printing mechanism D is provided with means for printing a period or decimal point in all cases between the second and third units thereof, the above mentioned third decimal order would have to be represented by the fifth unit "5" of the printing device D, and therefore the operator would have to actuate a switch 5V of the switch assembly V' which has the following results:

All the cores 3 of the half-matrix shown in FIGURE 1 are in saturated condition with a certain polarity, say P, at the beginning of the calculating operation. The polarity P is chosen in such a manner that impulses coming from the totalizer mechanism R via lines 1 have no influence on the condition of the cores 3 because they do not change the magnetic flux in the cores and therefore do not change the magnetism therein. However, when the switch 5V is actuated and an electrical impulse is sent into the diagonal control line 4, 5 (which means that this particular diagonal line 4 is connected with the switch 5V) whereby all the magnet cores 3 which are located along, and are served by, the particular diagonal control line 4, 5, are changed from the previous condition P into a saturated condition of reversed magnetic polarity, say N. Now, as mentioned above, ten checking impulses are injected into all the units of the totalizer mechanism R and are emitted by means generally known and therefore only shown as a block C in the FIGURE 1, synchronously with the forward movement of the control of the printing device D. Preferably the impulse generator for the ten checking impulses is operated together with the mechanism for the forward movement of the type-setting rods of the printing device, so that a checking impulse is injected into the totalizer mechanism every time when the printing device has been adjusted so as to be ready for printing a digit figure one step advanced from the previous one. An arrangement of this type is also described in U.S. Patent 2,757,862.

Figure 9:
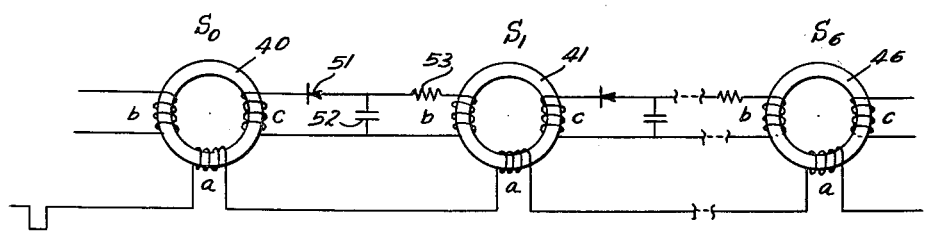
FIGURE 9 illustrates diagrammatically details of a step-wise operating control arrangement as incorporated in the arrangement of FIGURE 2.

The consecutive impulses, as mentioned above, "count" in every unit of the totalizer mechanism R the numerical value present in the particular decimal order down to zero, i.e., every single impulse impinging upon every one of said units reduces the numerical value present therein by a unit "1." The "counting back" process is described e.g. on page 69 of Kretzmann "Industrial Electronic Circuits," published by Philips Technical Library (Eindhoven, Holland). Magnetic core registers capable of operating as a totalizer mechanism R are well known to the art as "Woo-Chains" as shown in FIG. 9, and described in my copending U.S. application Serial No. 666,096 in reference to FIG. 2 thereof, filed June 17, 1957, and assigned to the same assignee. Registers of this type, upon being supplied with a sequence of checking impulses, "count" or shift a stored value stepwise down and issue an impulse when the value "0" is reached. When this operation passes through "zero" in any one of said units of the totalizer mechanism, this particular unit emits an impulse through the pertaining line 1 and those magnetic cores which are located at the intersection of the now activated diagonal control line 4, 5 with the affected lines 1, will be re-magnetized i.e., returned to the saturated condition P which the particular core had before the switch 5V was operated. It is evident that by the resulting change of magnetic flux or polarity of the particular core from N to P an impulse is generated by induction in the line 2 which leads from the particular core to the printing device. This impulse received by the unit "5" of the printing device D is then amplified by an amplifier $V_0$ and actuates a blocking oscillator $Sp$ and a locking magnet M. The magnet M when actuated causes a locking pawl to engage the associated typesetting rod during the advancing movement of the latter whereby this rod is locked against further advance. In FIGURE 1, for the sake of simplifying the drawing, the combination of components $V_0$, $Sp$ and M has been shown only in connection with the unit "5" of the printing device D but it must be understood, of course, that every one of the units of the printing device is equipped in exactly the same manner.

Figure 8:
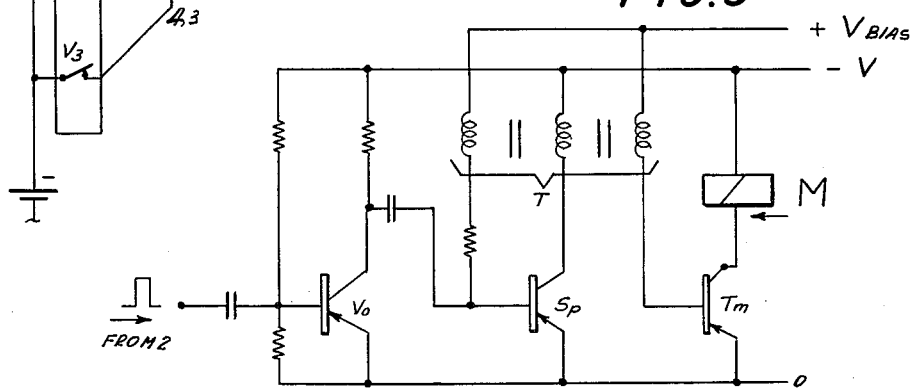
FIGURE 8 illustrates certain details of the one mechanism indicated in FIGURE 2.

FIGURE 8 will serve to illustrate diagrammatically the arrangement of the combinations $V_0$, $Sp$ and M. Details as for instance the locking pawl, type-setting rod and similar elements are not shown in the drawings because they are entirely known and conventional and do not form a part of this invention.

In the particular example of a calculation the result of which is 309.9375, the above mentioned situation of the individual locking pawls engaging the pertaining forward moving type-setting rod would have occurred in the unit "4" of the device D (corresponding to the unit "7" in the mechanism R) at the moment when the first impulse was received, and in the same manner this situation would have occurred analogously in the unit "5" of device D (corresponding to unit "8" of mechanism R) and in the unit "1" of device D (corresponding to unit "4" of mechanism R) at the moment of the arrival of the fourth impulse, which means in this latter case even simultaneously. Therefore the type-carrying element of the unit "4" of the device D is locked in position for printing the numeral 0, while the corresponding type-carrying elements of the units "5" and "1" of the device D are both locked in position for printing a numeral 3. When the tenth checking impulse arrives, the printing segments of the two units "2" and "3" of the device D are locked in the position for printing the numeral 9. The unit "6" of the device D does not print any figure because in this particular case the type bar would have to move one step forward if a "zero" would have to be printed. Therefore the printing device D will print the result as 309.93 with the decimal point in the correct position.

Every time an impulse is transmitted from the totalizer mechanism R to the printing device D the particular magnetic core 3 that was used in this operation is reversed, as stated above, in its magnetism and returns from N condition into the original saturated condition P so that after complete transmission of the result to the printing device D all the magnetic cores 3 of the half-matrix are in the magnetic saturated condition P which they were in before the beginning of the calculating operation. Therefore any further impulses arriving through the lines 1 remain without any effect on the printing device because their polarity, as stated above, is such that they would only tend to produce the already existing condition P, so that an erroneous or wrong transmission is entirely excluded.

Figure 5:
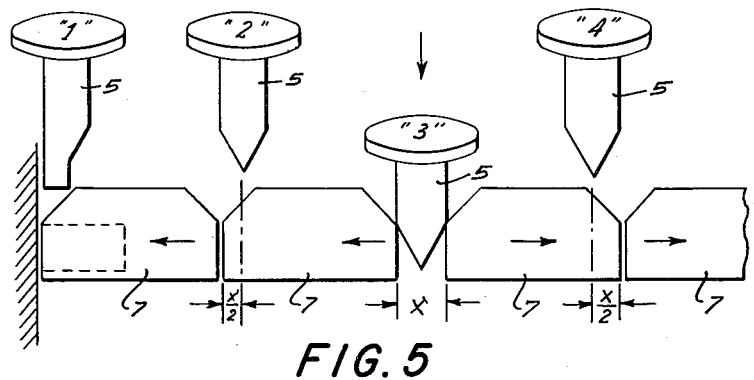
FIGURE 5 illustrates diagrammatically a special type of switch means provided for instance in the arrangement according to FIGURE 1.

It should be mentioned that it is advisable to provide the switch assembly V' with means that make sure that at any time only one of the switches 1V, 2V etc. can be actuated. FIGURE 5 illustrates diagrammatically a simple device that would have this effect. Four keys 5 corresponding respectively to the switches 1V–4V are shown as having at their lower end a one-sided or double-sided taper which is adapted to cooperate with corresponding tapered corners of a series of sliding blocks 7 arranged in one row underneath a series of keys 5. The sliding blocks 7 are lined up between two end walls of which only one is shown at the left of FIGURE 5. Adding up the length of the total number of individual blocks 7 adds up to a length which is equal to the spacing between said two end walls minus a dimension $x$ which may be made equal to the thickness of the shank of each individual key 5. As is evident from FIGURE 5, actuating one of the keys 5 results in moving the blocks apart so that the particular key 5 can be moved down sufficiently to operate the corresponding switch while then there is no room left for anyone of the other keys 5 to be actuated as long as the switch associated with the first operated key 5 is in operative position.

Figure 6:
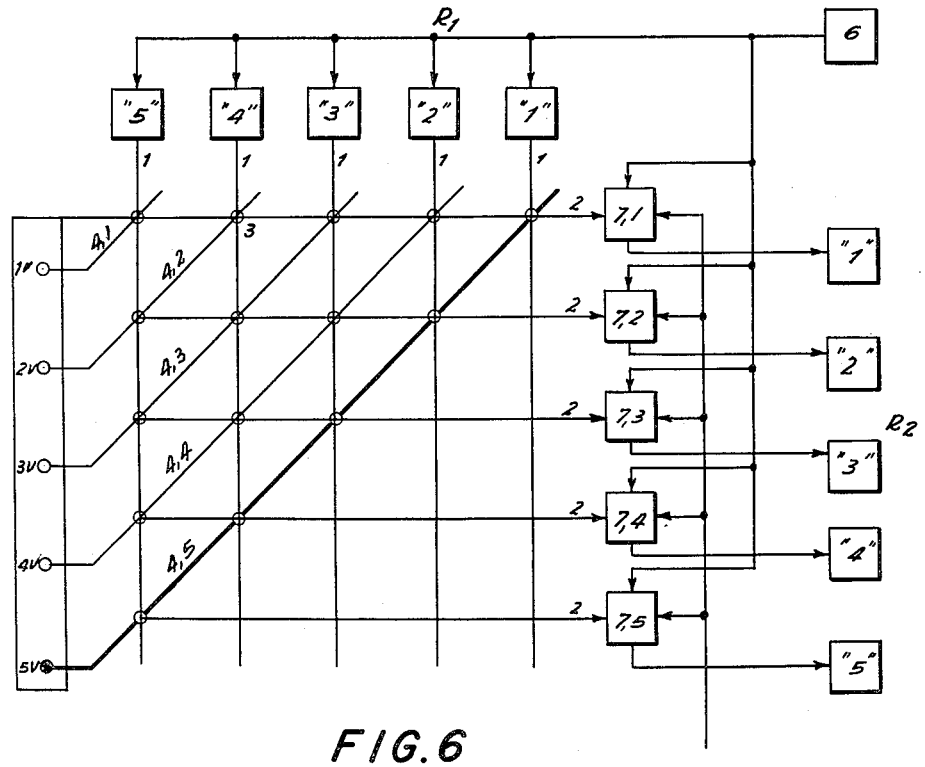
FIGURE 6, illustrates diagramatically a modified form of the arrangement illustrated by FIGURE 2.
Figure 7:
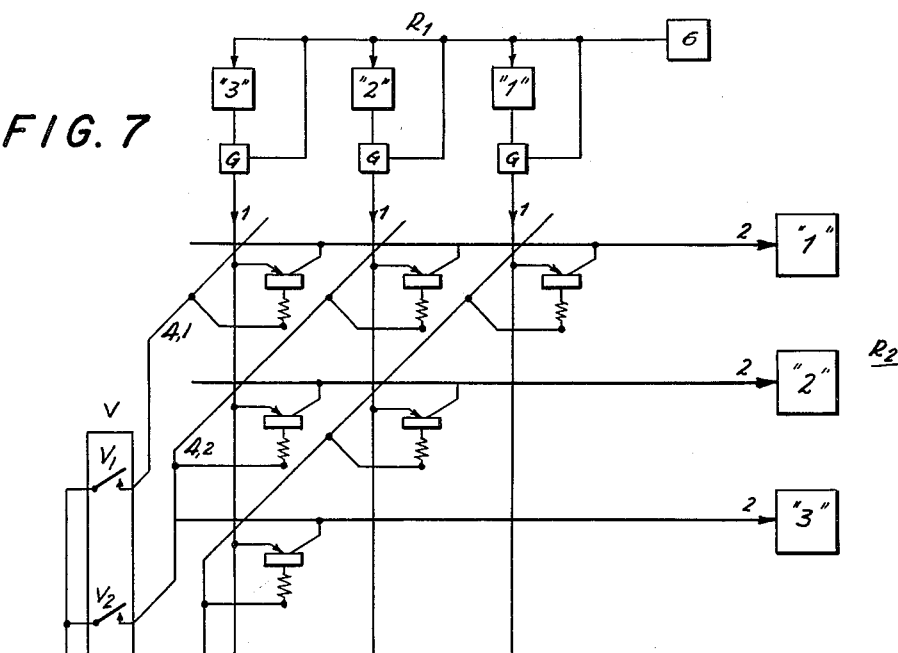
FIGURE 7 illustrates diagrammatically a version of the arrangement shown in FIGURE 1, incorporating transistor type connecting elements instead of magnetic connecting elements.

In the example described above the printing device D is of electro-mechanical nature. If this electromechanical device is replaced by an electronic mechanism, for instance an accumulator device then the above described operations and arrangements are to be modified as follows:

FIGURE 6 illustrates an arrangement which serves for the transmission of numerical values from an electronic mechanism $R_1$ to another electronic mechanism $R_2$. This arrangement also permits shifting the decimal order of the transmitted values during transmission. Again a series of ten impulses is generated in the impulse generator 6 and injected into all the units of the electronic accumulator mechanism $R_1$ simultaneously. The said ten impulses act in the accumulator subtractively. Every time "zero" is passed, the individual units of the accumulator mechanism $R_1$ emit a primary impulse into the lines 1 of the half-matrix. The sequence of ten impulses generated by the impulse generator 6 is simultaneously fed to gate circuits 7, 1–7, 5 which are respectively associated with the individual units "1"–"5" of the second electronic accumulator mechanism $R_2$. At the beginning of the transmission operation the above mentioned gate circuits are in open condition so that the ten impulses are able to pass through these gate circuits into the pertaining impulse-receiving units of the accumulator $R_2$ where they operate additively. The impulses coming from the accumulator mechanism $R_1$ are transmitted via the half-matrix and the lines 2 to the gate circuits 7, 1–7, 5 and change the latter to blocking condition. Consequently, into each unit of the accumulator mechanism $R_2$ only as many of said ten impulses can be additively introduced, as there were impulses which were subtractively operative up to the arrival at "zero" in that particular unit of the accumulator mechanism $R_1$ which is coordinated via the half-matrix to the particular unit of the mechanism $R_2$. The proper association of individual decimal orders of the figures involved in the operation is effected in the same manner as described above with respect to the shifting of decimal orders for the purpose of printing the result.

It is quite evident that this method of transmission may be modified, for instance in such a manner that the series of ten impulses operate additively in the accumulator mechanism $R_1$ in which case the gate circuits 7, 1–7, 5 must be primarily in blocked condition. Then these gate circuits will be opened only by the impulses occurring when the checking operation passes the "ten" value, and at the end of each series of ten impulses the gate circuit returns to blocking condition. However, in the accumulator mechanism $R_2$ the "counting" is carried out also in this case in additive direction.

There is still another possible modification of the method of transmitting a value from one electronic counting mechanism to another one. It is not too difficult to carry out such a transmission of values by sending identical impulses into both mechanisms. In this case the arrangement has to be modified in such a manner that the gate circuits controlling the input of the impulse-receiving units of the second mechanism are changed to open condition by the impulse which is emitted from the pulse-emitting units at the moment when the counting operation passes through "zero." In this manner the real value is transmitted from the pulse-emitting mechanism to the pulse-receiving mechanism. Still another possibility consists in leaving the gate circuits in "open" condition at the beginning of the injection of the series of ten impulses and of closing the gate circuits subsequently at the time when in the transmitting mechanism the operation passes through "zero." In this manner the complement value will appear in the receiving mechanism. It is hardly necessary to stress that a transmission of numerical values between two electronic mechanisms can be carried out at any desired high speed and without interposition of synchronizing devices. Of course, in the case of transmitting numerical values from an electronic mechanism to an electromechanical mechanism the speed of transmission is lower because the electro-mechanical mechanism is the slower operating part and therefore determines or limits the maximum speed for the transmission operation.

Instead of the magnetic cores shown and illustrated in FIGURES 1 and 4 the connecting elements between the various lines 1 and 2 may also be transistors. In this case the collector of each transistor is connected with the pertaining line 1 while the corresponding emitter is connected with the corresponding line 2. The diagonal control line 4 is in this case connected to the base of the particular transistor. It should be understood, of course, that in this embodiment the intersection and crossing of the lines 1, 2 and 4 is not necessarily carried out in one geometrical point as can be done in the case of the magnetic core assembly according to FIGURE 4. FIGURE 7a illustrates what in the context of this application is intended to be indicated by calling the location of the individual transistors 3' "an intersection point."

Evidently, when a negative potential is applied to any one of the diagonal control lines 4 then the transistors along that particular diagonal control line are rendered conductive. This is possible to achieve by using p-n-p transistors which, when a negative potential is applied to their base, are conductive and permit passage of the impulses coming from the impulse-emitting units, to the receiving mechanism. Contrary to the conditions prevailing in the case of use of magnetic cores the transistors are not changed into non-conductive condition by a subsequent impulse. Actually, the transistors remain conductive as long as a negative potential is applied to their bases. In the present example FIGURE 7 illustrates a situation where the switch V3 has been closed so as to apply a negative potential to the diagonal line 4, 3. Hereby a transmission of impulses from the unit "3" of the mechanism $R_1$ to the unit "3" of the mechanism $R_2$ has been made possible.

It should be noted that the switch assembly V' on FIGURE 1 is connected with an impulse generator not shown so that every time one of the switches 1V etc. is operated an electrical impulse of predetermined polarity is injected into the diagonal control line connected in circuit with a particular switch. Preferably, the individual switches 1V etc. are built in such a manner that when they are actuated they actually induce the generator to emit an impulse and at the same time they close the contacts connecting the impulse generator with the particular diagonal control line.

Figure 2:
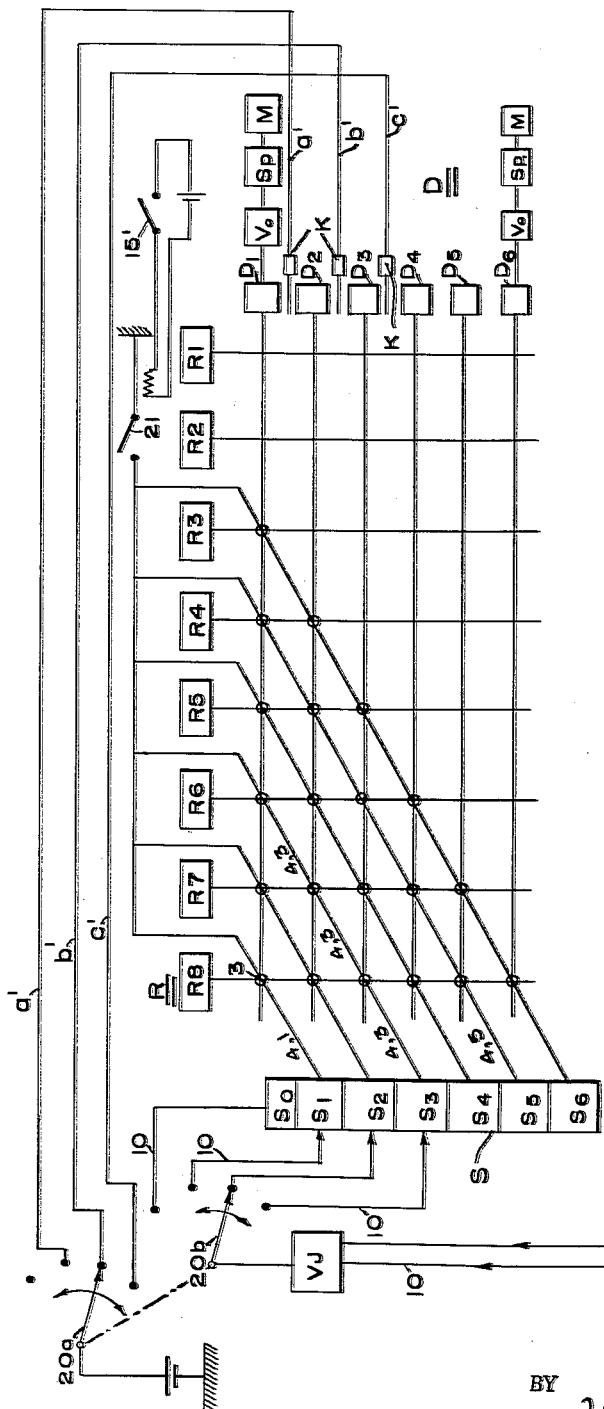
FIGURE 2 is a similar diagrammatic illustration of a modified arrangement which includes means for automatically shifting the decimal orders.
Figure 2:
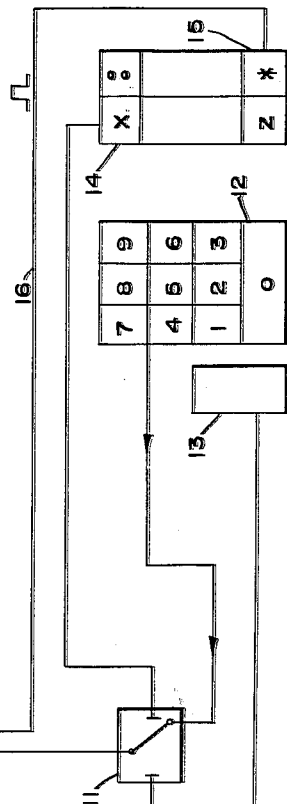
Figure 2A:
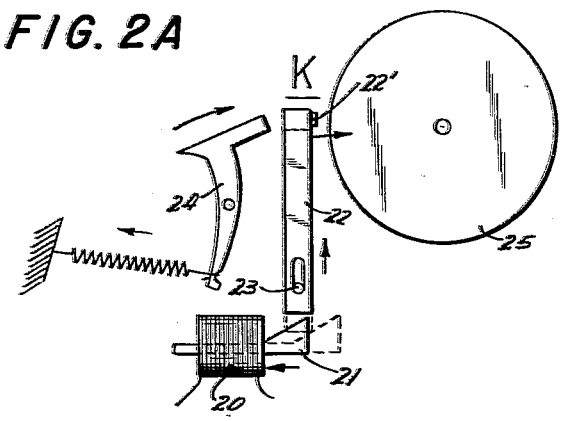
FIGURES 2a and 2b illustrate diagrammatically certain details of elements of the arrangement of FIGURE 2.
Figure 2B:
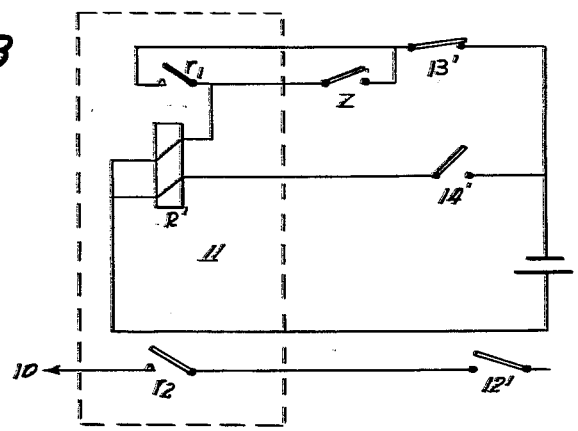

Referring now to FIGURE 2, a further developed embodiment of the invention offers the advantage that the determination of the position of the decimal point in he result is carried out automatically by the machine. In this manner mistakes are avoided which may easily occur if this operation is carried out entirely manually or through calculation by the operator. In addition, the calculating operation is greatly accelerated. For instance, in the case of multiplications and divisions the determination of the position of the decimal point can be carried out by an electronic step-wise operating combination of control elements which advances one step every time when through the operation of a calculator key by the operator the calculator is set for the individual digits of the first and the second factor. However, this would still include the condition that the decimal point is set by the operator in correct position by operating a special decimal point key of the calculator keyboard at the time when the entire value of a factor is given to the calculator by the handling of the individual keys. In this manner the electronic stepping control combination obtains information how many decimal orders are present in the particular factor to the left of the decimal point. In the lower part of FIGURE 2 the essential operating elements of the keyboard of a calculator are shown in diagrammatical fashion. The keyboard has a set of ten digital keys 12, a separate key 13 for producing a comma or decimal point, and a key 14 for causing a multiplication operation to start. In addition there is a key 15 which is used when a completed result is to be printed. However, the just mentioned keys of the keyboard at the same time serve to operate switch means which are required for carrying out certain operations required by the present invention. FIGURE 2b illustrates diagrammatically in what manner the switch means operated by the keys mentioned above cooperate with other elements of the arrangement shown in FIGURE 2. Also, in the upper portion of FIGURE 2 a small circuit diagram is inserted in order to show the relation between a switch 21 described below and a contact operated by the above mentioned printing key 15. For easier understanding, the electrical contacts operated by the individual keys are designated by numerals having the prime symbol added to the numeral designating the associated key. The contact 13' is normally closed while the contacts 12', 14' and 15' are normally open.

The assembly S is an electronic step-wise operating combination of control elements $S_0$, $S_1$, $S_2$, etc. Every time any one of the number keys 12 are depressed the stepping combination S is induced to make one operational step forward. Whenever the decimal point key 13 is depressed the stepping combination S is stopped from making any further forward step and this condition remains until the multiplication key 14 is depressed whereby the stepping operation of the combination S is reinstated. The operation of the stepping combination S is controlled by said switches or contacts 12', 13' and 14' via a relay switch arrangement 11 which is shown by way of example in FIGURE 2b. The solenoid R' has two windings, one in circuit with the switch contact 14' and a source of electricity, the other winding in circuit with one normally open relay holding contact $r_1$ and in series with the normally closed switch contact 13' a normally open start switch Z being connected in parallel with contact $r_1$. In addition the relay R' has a second normally open relay contact $r_2$ which is directly in circuit between the switch contact 12' and the line 10 connecting the relay with the stepping combination S.

Since the contact 13' is normally closed, at the beginning of the operation the relay R' is actuated by briefly closing contact Z and the relay contacts $r_1$ and $r_2$ are closed and remain so. Therefore every operation of the contact 12' injects an impulse through the connecting line 10 into the stepping combination S so that the latter makes every time one step forward as will be explained later. When all the number keys corresponding to the digits to the left of the decimal point of the first factor have been depressed the operator has to depress the decimal point key 13. This causes the switch contact 13' to open and to interrupt the current through the relay so that the contacts $r_1$ and $r_2$ open with the effect that depressing further keys on the number keyboard 12 for the digits to the right of the decimal point will not transmit an impulse through the line 10 to the stepping combination S. If subsequently the first factor has been completely injected into the calculator then the operator has to depress the key 14 in order to cause the calculator to carry out a multiplication of the already injected factor with the next following figure to be injected as a factor into the calculator. The corresponding closing of the contact 14' again actuates the relay R' and therefore again closes the two relay contacts $r_1$ and $r_2$ and holds them in this position so that when the operator continues to operate the keyboard 12 for injecting the next figure as a factor, then every time one of the number keys of the switchboard 12 is depressed, an impulse is transmitted to the stepping combination S to cause the latter to advance stepwise.

On account of the above-described operation of the calculator in the case of a multiplication, in every case the number of decimal orders to the left of the decimal point in one factor is automatically added to the number of decimal orders to the left of the decimal point in the other factor whereby the number of decimal orders to the left of the decimal point in the result or product of this multiplication is automatically predetermined so that as one digit after the other appears in the product in the result-indicating or result-printing mechanism the decimal point can be indicated or printed immediately in the correct position. Referring once more to the above-mentioned example of a multiplication, the stepwise operating combination S would have carried out three steps.

The embodiment of the invention illustrated by FIG. 2 is generally similar to that of FIG. 1 except for the fact that in this case the combination of switches V' is replaced by the already mentioned stepping combination, i.e. a stepwise operating combination of control elements S. As a matter of fact, it would be possible to use an electro-mechanical stepping switch as such a combination. However, such a stepping switch would have all the disadvantages pointed out in the introductory part of this specification. Therefore, the preferred embodiment of the invention illustrated by FIG. 2 comprises as a stepping combination an electromagnetic chain as illustrated by way of example in FIG. 9. A chain of this type eliminates all the disadvantages of mechanical contacts and is advantageously characterized by a practically unlimited life. The function and operation of this magnetic chain is as follows.

Corresponding to the squares $S_0$, $S_1$, $S_2$ ... $S_6$ representing the individual step control elements of the combination S (analogous to the switches 1V, 2V ... 6V of FIG. 1) the magnetic chain (generally known as a Woo-chain) comprises a series of magnetic cores 40, 41 ... 46. In this example the chain has only six magnetic cores because it serves a printing mechanism comprising only six units $D_1$, $D_2$ ... $D_6$ for handling six digit figures.

Each of the magnetic cores 40, 41 ... 46 is provided with three windings, respectively. The winding identified by the letter $a$ of each magnetic core is connected in series with the $a$ windings of the other five cores. The $b$ windings are the input windings while the $c$ windings are the output windings of each unit. It can be seen that each of the output windings $c$ is connected respectively to the input winding $b$ of the next adjacent magnetic core via a rectifier 51, a capacitor 52 and a resistor 53 in series-parallel arrangement. Each of the magnetic cores has a substantially rectangular hysteresis loop. When the arrangement is in starting condition, the magnetic cores 41–46 each have a negative remanent induction, i.e. a magnetic saturation of one predetermined polarity, while the first core 40 is saturated with opposite polarity. Now, provided that the calculation does not comprise any decimal point and no decimal point is to be printed, the first impulse injected into the combination S, i.e. into the magnetic chain will not affect any one of the cores 41–46 (step control elements $S_1$–$S_6$) but only the core 40 in the "blind" element $S_0$ which will be magnetized to saturation of opposite polarity. This magnetization produces an impulse in the output winding $c$ of core 40 which is transmitted through rectifier 51 to the capacitor 52 and charges the latter. The capacitor 52 then discharges through the resistor 53 and the input winding $b$ of the core 41 corresponding to the digit 1. This last-mentioned impulse reverses the magnetization of the core 41 to opposite polarity which reversal induces an impulse in a winding, not shown, which is in circuit with the pertaining diagonal control line 4,1. The next impulse injected into the $a$ windings will have no effect on the magnetism of the cores 40 and 42–46 but will reverse the magnetism of core 41 whereby in the same manner as above an impulse will be transmitted to the next following core 42, causing therein the production of an impulse that will be injected into the diagonal control line 4,2. Consequently, whenever the control keys of the keyboard 12 are consecutively depressed for injecting a sequence of impulses representing a sequence of digits into the calculator, these impulses are consecutively distributed by the chain combination S into the corresponding diagonal control lines 4. As stated above, with reference to FIG. 1, the impulses emanating from the step control elements $S_1$ etc. and injected into the diagonal control lines 4 serve to actuate the connecting elements 3 for the purpose and in the manner set forth with respect to FIG. 1. If necessary, amplifier means may be connected between the individual step control elements and the diagonal control lines 4.

It should be noted that according to FIG. 2 all the diagonal control lines 4 can be made inoperative by a switch 21 when the latter is in open position. The purpose of this switch will be explained below.

If in the calculation decimal points occur and are to be printed with the result, then certain modifications of the arrangement are required as illustrated in FIG. 2. In this case a plurality of decimal point printing devices K are arranged between the units $D_1$, $D_2$, $D_3$ and $D_4$, respectively, of the printing mechanism. Details of these devices are shown in FIG. 2A. A printing lever 22 carries a type 22' for printing a decimal point on material supported by a drum 25. The lever 22 is adapted to swing about a pivot 23 towards the drum 25 but also to slide lengthwise with a slot being guided by the pin 23. The lever 22 is lifted from an inoperative position shown in dotted lines to the illustrated operative position by a wedge member 21 which is moved between an inoperative position shown in dotted lines, and an operative position shown in full lines, by means of an electromagnet 20 which can be energized by impulses fed through corresponding lines $a'$, $b'$, $c'$. The hammer 24 is evidently unable to cause the type 22' to print a decimal point unless the lever 22 is raised into operative position. The hammer 24 is operated by means not shown and not forming part of this invention.

Associated with the stepping combination S is a multi-contact selector switch 20a, 20b which has two switch arms, each adapted to selectively contact a series of stationary contacts. The contacts associated with the switch arm 20a are connected with the lines $a'$, $b'$, $c'$ mentioned above. The contacts associated with the switch arm 20b are connected consecutively with the individual step control elements $S_0$, $S_1$ etc. The connection between the last-mentioned contacts and the elements of the magnetic chain is such that if, for instance, the selector switch 20a, 20b is set, as shown, on the third contact, the first impulse injected will start the stepwise operation of the chain with the element $S_2$. In this manner the position of a decimal point is predetermined by setting the selector switch to the corresponding contact. It should be noted that simultaneously through the second switch arm 20a and through the selected line $b'$ a circuit is prepared for the decimal point printing device K located between the printing units $D_2$ and $D_3$. Thus, when an impulse for printing a decimal point is transmitted only this particular printing device will respond.

Referring again to the above-mentioned example of a calculation, the selector switch being in the position shown, the operator, after having depressed the keys for the first two digits of the first multiplication factor, would depress the decimal point key 13. Hereby, the relay means 11 is actuated as described above so that the actuation of digit keys of the keyboard 12 for injecting digits of the particular factor and located to the right of the decimal point has no effect because the connection between switch 12' and the connecting lines 10 to the stepping combination S is interrupted, so that after the operation of the switch 13' no forward step takes place in the stepping combination S. After the operator has injected the whole first factor he will depress the multiplication key 14 and thereby close the switch 14'. Hereby the relay R' is re-energized and the connection between switch 12' and the lines 10 is reestablished. Now the operator may continue by depressing the digit keys of the keyboard 12 for injecting impulses into the calculator representing the digits of the second factor. The magnetic chain functions in the same manner as described above. When reaching the position of the decimal point in the second factor the operator again depresses the key 13 and thereby again interrupts the transmission of impulses through the switch 12' and the lines 10 to the step control elements. In the case of the specific example given above, the operation of the chain would be stopped in the element $S_5$ when key 13 is depressed during injection of the second factor.

After injection of the last digit of the second factor into the calculator, the result or product is present in the totalizer mechanism R and is transferred into the printing device by operation of a printing key 15. In FIG. 2 a small circuit diagram is shown adjacent to the switch 21. This switch is operated electromagnetically by closing a circuit which is done by the operation of key 15 which closes the switch 15'. Simultaneously with this an impulse is transmitted from the key 15 through a line 16 to the magnetic chain and stepping combination S. Thereby the magnet core associated with the step control element $S_5$ is returned to its previous polarity, and the polarity of the core associated with the step control element $S_6$ is reversed. The change of polarity in the core of $S_5$ produces an impulse which is injected into the line 4,5 which now is in operative condition because the switch 21 is closed so that all the cores 3 along the diagonal control line 4,5 are so magnetized that the matrix is prepared for transmitting impulses from the totalizer mechanism R to the printing mechanism D. The actual transmission between the two mechanisms is effected in the same manner as described with respect to FIG. 1.

In the case of carrying out divisions instead of multiplications, in the determination of the position of the decimal point in the quotient only the following is to be noted. When the dividend is injected into the calculator, the stepping combination S has to "count" in forward direction, in the same manner as in the case of multiplication, but after operating the division key, causing the calculator to carry out a division, and during the subsequent injection of the divisor the chain or stepping combination S has to "count" backward or in other words in opposite direction. The key causing division simply reverses the direction of the stepping operation. The operation of "forward" and "backward counting" is described e.g. in Kretzmann "Industrial Electronic Circuits" (FIGS. 2–26), published by Philips Technical Library (Eindhoven, Holland) and in my copending application Serial No. 666,096, filed June 17, 1957. Otherwise, the function of the parts involved is exactly the same as that described in connection with switch 14' and key 14 and is therefore not illustrated.

In apparatus working without a variable position of the decimal point, for instance billing machines with a fixed decimal point between the second and third decimal order, the key 13 and the pertaining elements are not needed. In this case, it is very simple to modify the arrangement according to the invention in such a manner that the calculator automatically determines the correct association of decimal orders between the various mechanisms, for instance between the totalizer mechanism R and the printing device D. Of course, in this case, the operator has to inject into the calculator by operating the keyboard 12 also the two digits to the right of the decimal point, even if these two digits would be both "zeros." In this case there is never a question that the two last digits injected with every factor are the two last digits after the decimal point.

In the case of additions or subtractions involving no shifting of the position of the decimal points, respectively, of the various values, the desired association of the decimal orders can be adjusted in advance and does not require any changes. Since in this case every partial value or result needs transmission from one mechanism to the other, the intersection points between the lines 1 and 2 are preferably equipped with transistors.

FIG. 7 illustrates as an example for this type of an arrangement a partial diagram involving only a set of three lines 1 and three lines 2. FIG. 7A illustrates at a larger scale in a perspective view one intersection of lines 1 and 2 and the crossing diagonal control line 4 as well as the connection of a transistor 3', the base of which is connected with the line 4, while the emitter is connected to line 1 and the collector to line 2.

FIG. 8 illustrates diagrammatically the essential details of the operating means associated with every one of the units $D_1$ etc. of the printing device D and comprising mainly an amplifier $V_0$, a blocking oscillator $Sp$ and a magnet M which operates certain elements of the printing mechanism.

As shown in FIG. 8, the amplifier $V_0$ as well as the oscillator $Sp$ are transistors. A positive signal as shown at the left of FIG. 8 and coming from a line 2 blocks transistor $V_0$ which serves only to amplify and to reverse the polarity of said signal. The negative signal appearing in the collector circuit of the transistor $V_0$ triggers the blocking oscillator transistor $Sp$ and causes the appearance, at the transformer T connected in the collector circuit of the transistor $Sp$ of a feed-back signal of definite duration which serves to control and to render conductive a third transistor $T_m$. The current flowing through this transistor energizes the solenoid M which then operates the blocking mechanism for the printing device as shown in FIG. 2A where the solenoid M appears as electromagnet 20.

Figure 3:
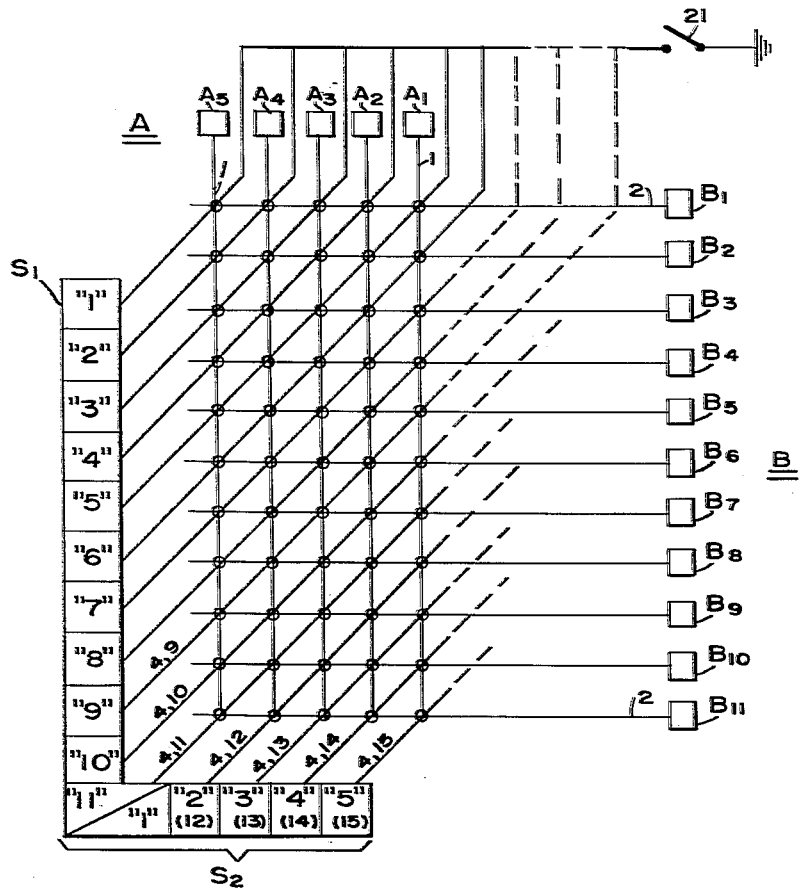
FIGURE 3 is a diagrammatic illustration of means provided for transmitting multi-order values in both directions between mechanisms of the calculator.

FIG. 3 illustrates another embodiment of the invention. In this case a mechanism comprising five units $A_1$, $A_2$ ... $A_5$ for injecting values is operatively connected with a calculating mechanism B designed for handling up to eleven digits by means of eleven units $B_1$ ... $B_{11}$ in such a manner that, for instance in the course of mixed calculations shifting of decimal orders can be carried out between these two mechanisms. For this purpose, as illustrated by FIG. 3 implicitly, a stepping combination $S_1$ would be sufficient and in this case even the cores along the diagonal control lines 4,12–4,15 and the corresponding diagonal lines 4,12–4,15 would not be necessary. However, it may be desirable to re-transfer values from the mechanism B to the mechanism A, also requiring variable association of decimal orders. Therefore, a second stepping combination $S_2$ is provided which forms a direct continuation of the combination $S_1$. Associated with the stepping combination $S_2$ are the diagonal control lines 4,11–4,15. It will be noted that the last step control element "11" of combination $S_1$ and the first element "1" of combination $S_2$ are actually one element as is indicated in FIG. 3. When values are to be transmitted from mechanism A to mechanism B the operation is started with the first element of the combination $S_1$. However, in the case of re-transfer of values from the mechanism B to mechanism A the operation starts with the last element of the combination $S_2$ and continues in backward direction.

Every one of the combinations $S_1$ and $S_2$ is supposed to be an electromagnetic chain of the type illustrated in FIG. 9 except that in this case a "blind" element or unit is not required. The digits of the multiplicand are injected in the units $A_1$–$A_5$ and are stored in this mechanism A even after these values have been transmitted to the mechanism B. When the calculation is completed the mechanism A can be cleared of these values by means of a clearing key not shown. At the beginning of a multiplication the magnetization of the step control element "11", which has been changed in magnetic polarity before, is now reversed back whereafter the multiplicand can be transmitted from the units $A_1$–$A_5$ to the units $B_7$–$B_{11}$. From the mechanism B the received value may be transferred in single or multiple fashion, in a manner not forming part of this invention to a totalizer or result-storage mechanism, the single or multiple fashion depending upon the digit represented by the multiplier key operated for this purpose. Every time another multiplier key is operated the magnet cores along the diagonal control lines 4,10 etc. are reversed in their magnetic polarity so that the multiplicands stored in the mechanism A are now transmitted to the units $B_6$–$B_{10}$ of the mechanism B. After the result of the operation has been determined in this manner and stored in the not shown result-storage mechanism, it can be transmitted from there with proper association of decimal orders to a printing mechanism by means of a half-matrix in the manner described above.

As mentioned above, it is of particular advantage to arrange at the intersection points of the lines 1 and 2 transistors as shown in FIG. 7 or other equivalent devices which permit the passage of a plurality of impulses sequentially, said transistors or equivalent devices being made conductive by means of a transistor counting chain of generally known type as, for instance, described in the German printed patent publication No. 1,011,465 and "Transistors Handbook" by W. D. Bevitt (Prentice-Hall Inc., 1956), Chapter 20, Sec. 6, p. 354. In this case the mechanism A can be simultaneously the calculating mechanism and the mechanism receiving the values handled in the calculation, while the mechanism B would be the totalizer or result-storage mechanism. Since the transistors are capable of transmitting any number of consecutive impulses from the lines 1 to the lines 2, it is only necessary, after storing the multiplicand in the mechanism A to inject into it sequentially a number of groups of ten impulses each, each group corresponding to one decimal digit of the multiplier into the mechanism A. For instance, if 34589×15 is to be calculated, first 34589 is stored in the units A5–A1 of A. According to the "tens" digit 1 of the multiplier 15 first a series of 10 impulses is injected into A, whereby 34589 is transmitted to, and stored in B. Then, according to the "ones" digit 5, five series of 10 impulses are sequentially injected into A, whereby with a "one-step" order shift, 34589 is five times transmitted to B: In B, all these consecutive produced components are totalized and yield the result.

```
 34589
 34589
 34589
 34589
 34589
 34589
 ─────
518835
```

In the mechanism B, the accumulated partial additions of a multiplication, or the accumulated subtractions of divisions of the value stored in mechanism A are "counted" into those pulse-receiving units of mechanism B which are connected with units of the mechanism A. In this case gate circuits must be connected with the mechanism B, these gates being opened and closed, respectively, by the arriving signal of the corresponding unit of the mechanism A when the sequence passes over "9" or below "zero", respectively, while the same gates are again closed or opened, respectively, by an advance signal which precedes every series of ten impulses. The transistor counting chain which operates the transistors of the individual diagonal control lines, is operated to cause a shift of one step, i.e. one decimal order every time the next following multiplier key is operated.

As is further illustrated by FIG. 3, a second stepping combination $S_2$ is provided so that the intersecting sets of lines 1 and 2 do not constitute a half-matrix but a full matrix. This arrangement makes it possible that with the aid of the stepping combination $S_2$ the values stored in the mechanism B as a result of a multiplication can also be re-transferred into the mechanism A in any desired mutual association of decimal orders. This re-transmission may become desirable in the case of serial multiplications of the type $(Q \times U) \times Z$. First, Q is stored in A, multiplied with U as explained above, so that $(Q \times U)$ is stored in B. Mechanisms A and B being registers of practically the same type, injection of a series of 10 pulses into B will result in re-transmission of $(Q \times U)$ into A, whereafter the injection of Z series of 10 pulses each will produce the final multiplication $(Q \times U) \times Z$ with the result stored in B. The stepping combination $S_2$ is illustrated in FIG. 3 as if it were a separate component. However, since the element "11" of the combination $S_1$ overlaps the element "1" of the combination $S_2$, and both these elements (which are for all practical purposes equivalent to one single element) are in circuit with one single diagonal control line 4,11, it may be of advantage to unite the two stepping combinations $S_1$ and $S_2$ so that one joined combination of 15 step control elements is set up. In this case, it is only necessary to note that in the case of transmission of values from mechanism A to mechanism B the element "1" of combination $S_1$ or element "11" thereof is used as the starting element for launching the stepping impulses, while in the case of re-transmission from the mechanism B to the mechanism A the element "5" of combination $S_2$ or element "1" thereof is used. In this matter it makes no difference in what manner the sections $S_1$ and $S_2$ of the joined combination are separated from each other during the performance of one or the other type of transmission of values.

It may be mentioned further, that the switch 21 shown in FIG. 3 and which is connected with all the diagonal lines 4 for properly magnetizing the cores located along these lines, remains permanently closed in the case of mixed calculations in which shifting of decimal orders in steps of one at a time is required, while the switch 21 must remain open in those cases in which shifting of the decimal orders in a magnitude of several orders may be necessary, until a specific desired diagonal line is reached. For instance, if by operation of unit "4" of $S_1$ a value stored in the unit $A_5$ of A has been transmitted by means of the diagonal line 4,4 to $B_4$, while switch 21 was closed, and if then the same value is to be transmitted from $A_5$ to $B_{10}$ (which means a shift of the order position of said value), then during the sequential operation of the units "5", "6," "7," "8" and "9" of $S_1$, the switch 21 is kept open to render all cores ineffective, but switch 21 is to be closed again when unit "10" is operated whereby by activation of the cores the transmission of said value via line 4,10 to $B_{10}$ is made possible. This applies analogously to transfers of values from mechanism B back to A.

In above description reference was made to a known type of forward and backward counting, stepwise operating combinations of control elements. An arrangement of this type is illustrated and described for instance in U.S. Patent 2,781,503 with reference to FIG. 6 thereof.

It will be understood that each of the elements described above, or two or more together, may also find a useful application in other types of electronic calculators differing from the types described above.

While the invention has been illustrated and described as embodied in electronic calculators including means for shifting of decimal orders, it is not intended to be limited to the details shown, since various modifications and structural changes may be made without departing in any way from the spirit of the present invention.

What is claimed as new and desired to be secured by Letters Patent is:

1. In an electronic calculator of the type described, in combination, a first mechanism including a first set of pulse-emitter means associated, respectively, with a first series of decimal orders, for emitting, in parallel relation from said set of pulse-emitter means, pulses representing, respectively, digits arranged in said first series of decimal orders; a second mechanism including a second set of pulse-receiver means associated, respectively, with a second series of decimal orders, for receiving, in parallel relation, pulses emitted from said pulse-emitter means; a set of first lines emanating from said pulse-emitter means, respectively, and assigned to the respective orders thereof; a set of second lines emanating from said pulse-receiver means, respectively, and assigned to the respective orders thereof; and a plurality of control means thereof for selectively transferring pulses from said pulse-emitter means to said pulse-receiver means, each of said control means serving to operatively connect a different combination of one of said first lines with one of said second lines, and each of said control means including an active element responding to application of a control pulse by transferring a pulse appearing in the first line of the respective combination of said lines to the second line of that combination; and actuating means for selectively applying said control pulses to said control means and comprising a series of individually operable actuating units respectively associated with said second series of decimal orders, said actuating units being operatively connected with respectively different ones of said control means in such a manner that pulses emitted from at least one of said pulse-emitter means associated with a particular order are transferred, upon operation of a selected one of said actuating units, to a selected one of said pulse-receiver means which is associated with the same decimal order as said selected actuating unit, whereby parallel pulses representing values containing digits in a plurality of orders and emitted from one of said mechanisms are transmitted in parallel relation to the other one of said mechanisms in a selected association of the corresponding orders of said first and second series thereof depending upon selective application of a control pulse to selected control means.

2. An electronic calculator as set forth in claim 1, wherein said set of first lines extends in one first direction and said set of second lines extends in a direction transverse to said first direction so as to determine a plurality of intersection points where one of said first lines crosses one of said second lines; wherein said plurality of control means is respectively located at a plurality of said intersection points; and wherein additionally diagonal control lines extend from an intersection point between one first and one second line to the consecutive intersection points between the consecutive first lines and the consecutive second lines, respectively, each of said diagonal lines connecting a plurality of said control means with each other and serving to apply said voltage of predetermined polarity to the control means connected by the particular diagonal control line so that thereby the first and second lines crossing at any particular intersection point along the particular diagonal control line are respectively enabled to transmit pulses between said mechanisms; and means for injecting an actuating impulse selectively into any one of said diagonal control lines for actuating said active elements of said control means associated with the particular diagonal control line by application of a voltage of predetermined polarity, whereby in each such application a selected association of said first and second series of orders is determined.

3. An electronic calculator as set forth in claim 2 wherein out of a plurality of switch means movable between an inoperative and an operative condition each one is connected in a circuit with one of said diagonal control lines, respectively, said switch means being provided with blocking means precluding the possibility that of said plurality of switch means more than one at a time is placed into operative condition, in which it causes actuation of the active elements of the control means connected in the pertaining diagonal control line.

4. An electronic calculator as set forth in claim 3 wherein all the intersections between that one line of said set of first lines which is assigned to the highest order of said first series of decimal orders, and said set of second lines are equipped with one of said control means, respectively; and wherein one set of said diagonal control lines extends, respectively, only through every one of said intersection points along said one of said first lines which is assigned to said highest order, and only those intersection points between the remainder of said first lines and said set of second lines, respectively, which are crossed by any one of said one set of diagonal control lines, are equipped with said control means, so that, if there are not less than $n$ lines in said set of first lines and $n$ lines in said set of second lines only $\frac{1}{2} n \cdot (n+1)$ intersection points are equipped with said control means thus forming a half-matrix.

5. An electronic calculator as set forth in claim 4, wherein each of said control means is a transistor having a base, an emitter electrode and a collector electrode, said emitter and collector electrodes being conductively connected to said first and second lines, respectively, while said base is conductively connected to one of said diagonal control lines, so that each of said transistors is kept in conductive condition as long as the switching means connected in circuit with the particular pertaining diagonal control line is in operative condition.

6. An electronic calculator as set forth in claim 4, wherein each of said control means is a magnet core of the type characterized by a rectangular hysteresis loop and operatively assembled with said first, second and diagonal control lines crossing one another at the particular intersection point, for magnetization by impulses of predetermined polarity passing through any one of said lines, so that an impulse of one polarity injected into a diagonal control line by placing the connected switch means in operative condition actuates all of said cores located along said connected diagonal control line by placing them into a condition of remanent magnetism of predetermined polarity, which is reversed in any one of said cores located along the particular diagonal control line by an impulse of opposite polarity subsequently injected through the first line associated with the particular one of said cores, whereby an impulse is generated inductively in the associated second line for transmission to the corresponding unit of said second set of pulse-receiver units.

7. An electronic calculator as set forth in claim 3, wherein said switch means comprises manually controllable electronic circuit closing means.

8. An electronic calculator as set forth in claim 7, comprising calculator control members arranged as a key board, and said switch means comprising a multiple switching arrangement operatively connected with said calculating control members for being actuated automatically in a predetermined sequence when said calculating control members are operated.

9. An electronic calculator as set forth in claim 7, comprising calculator control members arranged as a key board, and said switch means comprising an impulse emitter arrangement operatively connected with said calculating control members for being actuated automatically in a predetermined sequence when said calculating control members are operated.

10. An electronic calculator as set forth in claim 8, said multiple switch arrangement consisting of an electronic stepwise operating combination of control elements.

11. An electronic calculator as set forth in claim 9, wherein said impulse emitter arrangement consists of an electronic stepwise operating combination of control elements.

12. An electronic calculator as set forth in claim 11, wherein said electronic stepwise operating combination or control elements is a progressively operating magnetic chain.

13. An electronic calculator as set forth in claim 12, wherein said electronic stepwise operating combination of control elements is a transistor counting chain.

14. An electronic calculator as set forth in claim 10, including a result-indicating mechanism and a first control member for injecting into the calculator mechanism an impulse for thereby inserting a decimal point within a multi-order value otherwise represented by said pulses transmitted from said first mechanism to said second mechanism, and including auxiliary contact means actuatable by said first control member and manually adjustable for various positions of the decimal point, said auxiliary contact means being associated and operatively connected with said electronic stepwise operating combination of control elements for producing in said result-indicating mechanism the decimal point within a multi-order value in a position determined by the adjustment of said auxiliary contact means.

15. An electronic calculator as set forth in claim 14, including a second control member for causing multiplying operation of said calculator, and a normally open first secondary switch associated with said second control member for being closed by said second control member when the latter is operated; a second normally closed secondary switch associated with said first control member for being opened, when said first control member is operated, for producing a decimal point in the result-indicating mechanism; and relay contact means operatively connected with said stepwise operating combination of control elements and operated alternatively by said first and second secondary switches to move between two operative conditions so that by opening said second secondary switch simultaneously with the operation determining the position of the decimal point in any one of the multiplication factors the progressive operation of said stepwise operating combination of control elements is precluded, while by closing said first secondary switch simultaneously with the operation causing the multiplication of one factor with another the progressive operation of said stepwise operating combination of control elements is reestablished, whereby during use of said calculator for multiplication the position of the decimal point in a multi-order result is automatically determined because said step-wise operating combination of control elements adds the number of decimal orders existing to the left of the decimal point of every one of the multiplication factors.

16. An electronic calculator as set forth in claim 15, including a third control member for causing dividing operation of the calculator, and a third secondary switch movable between a first and a second operative position and associated with said third control member for being moved by the latter, when operated, from said first into said second position, said third secondary switch being connected with said stepwise operating combination of control elements in such a manner that when said third secondary switch is in said second position the direction of stepwise operation of said stepwise operating combination of control elements is reversed so that during use of said calculator for division the position of the decimal point in a multi-order result is automatically determined because said stepwise operating combination of control elements subtracts the number of decimal orders to the left of the decimal point of the divisor from the number of decimal orders to the left of the decimal point of the dividend.

17. An electronic calculator as set forth in claim 10, including a set of fourth control members arranged as a keyboard for selectively causing the injection of impulses representing any one of ten digits into said calculator, and a fourth secondary switch movable between a first and a second position and associated with said series of fourth control members for being moved by any one thereof, when operated, from said first into said second position, said fourth secondary switch being connected with said stepwise operating combination of control elements in such a manner that every time when any one out of said set of fourth control members is operated and said fourth secondary switch is thereby moved into said second position, an impulse is injected into said stepwise operating combination of control elements for causing the latter to move one step from a condition corresponding to one decimal order to a condition corresponding to the next following decimal order.

18. An electronic calculator as set forth in claim 15, including a multi-contact selector switch having at least one switch arm and a plurality of individual contacts, and connected in circuit between said relay contact means and said stepwise operating combination of control elements, the individual contacts of said selector switch being respectively connected to corresponding step control elements of said stepwise operating combination of control elements, so that by setting said selector switch to any one of said individual contacts thereof the corresponding step control element is caused to be the starting step control element of said stepwise operating combination of control elements when the latter is started to progressive stepwise operation.

19. An electronic calculator as set forth in claim 18, which includes a result-printing mechanism comprising a plurality of first electro-magnetic devices for printing digits and a plurality of second electro-magnetic devices for selectively printing a decimal point at one selected position between digits printed by said first electro-magnetic devices; and wherein said multi-contact selector switch has a second switch arm moving conjointly with said one switch arm, and a second set of individual contacts selectively contacted by said second switch arm, said second set of individual contacts being connected respectively with said plurality of second electro-magnetic devices, so that by setting said multi-contact selector switch a circuit is selected and prepared for subsequently actuating a selected one of said second electro-magnetic devices for printing a decimal point in the selected position between said digits.

20. An electronic calculator as set forth in claim 2, wherein one of said mechanisms is an electronically operated mechanism and the other mechanism is an electro-magnetically operated mechanism, synchronizing means being provided and connected between said mechanisms for synchronizing the operations of said two mechanisms with each other.

21. An electronic calculator as set forth in claim 20, wherein said synchronizer means comprise an impulse-producing device operatively connected with said electro-magnetically operated mechanism for being driven thereby.

22. An electronic calculator as set forth in claim 21, wherein said impulse-producing device is driven together with the digit-control members of the calculator which serve to inject selected digits into the calculator mechanism, and is equipped with means for producing an impulse whenever the setting of said digit-control members has been altered from the setting for one value to a setting for the next following value.

References Cited in the file of this patent

UNITED STATES PATENTS

| | | |
|---|---|---|
| 2,108,896 | Lehmann et al. | Feb. 22, 1938 |
| 2,658,681 | Palmer et al. | Nov. 10, 1953 |
| 2,691,156 | Saltz et al. | Oct. 5, 1954 |

FOREIGN PATENTS

| | | |
|---|---|---|
| 760,562 | Great Britain | Oct. 31, 1956 |

OTHER REFERENCES

Bell Telephone Labs. Inc.—The Transistor, copyright 1951, pp. 562, 574, 581, 607, 621, 622 to 625.